Dec. 6, 1966     D. E. CARPER ETAL     3,290,009
APPARATUS FOR CONVEYING A HEAVY LINE DOWN A STEEP HILLSIDE
Filed Oct. 1, 1965
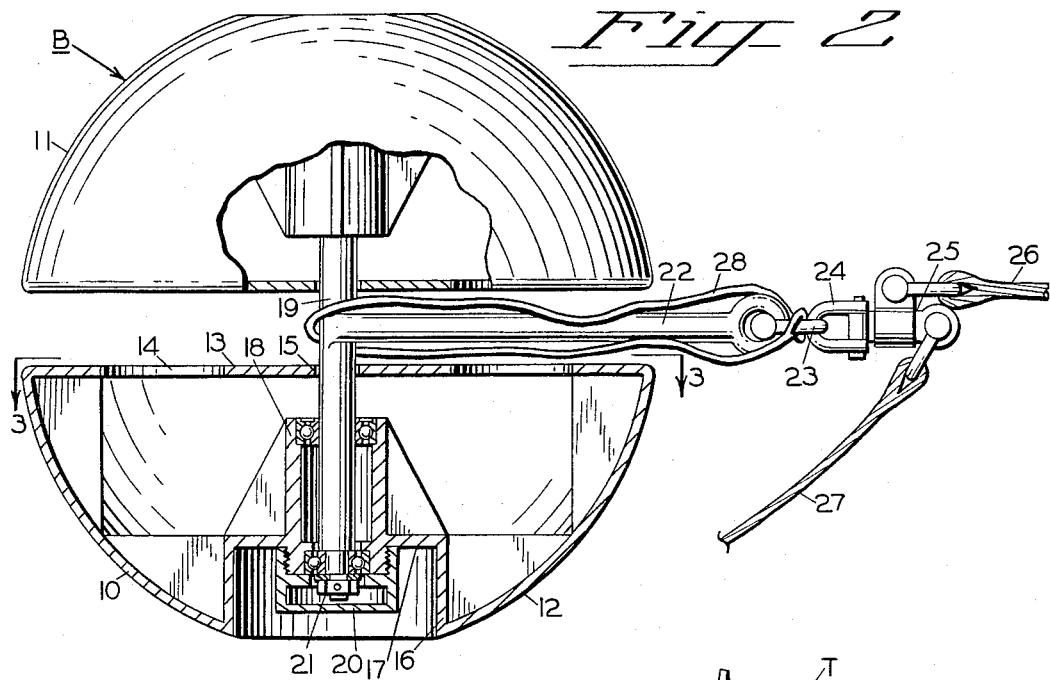
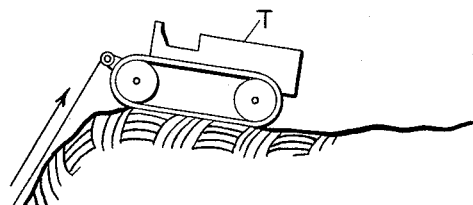
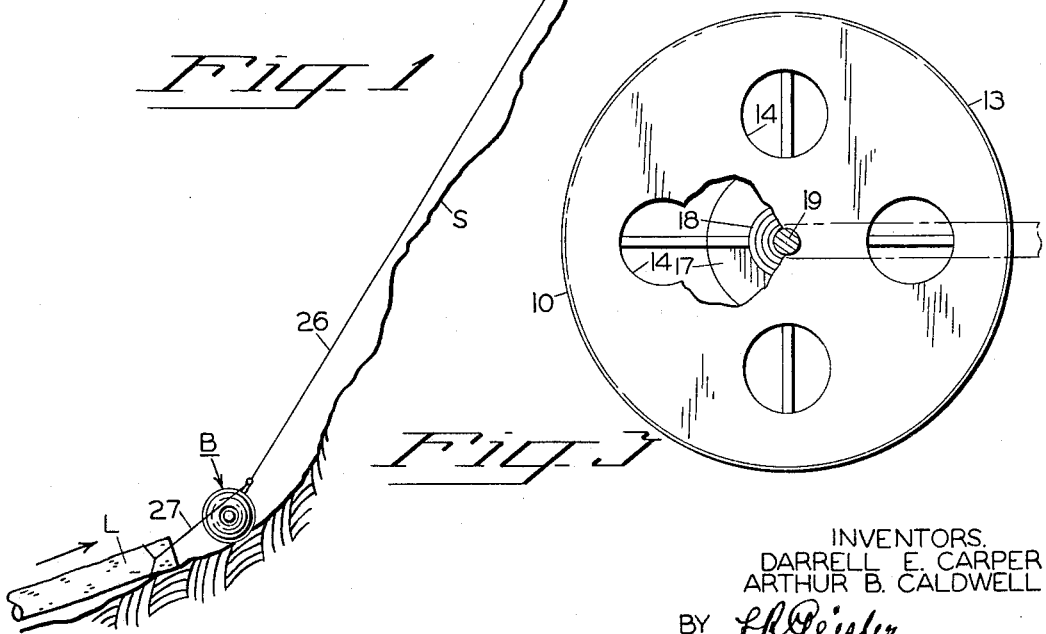
INVENTORS.
DARRELL E. CARPER
ARTHUR B. CALDWELL
BY *F. R. Geisler*
ATTORNEY

United States Patent Office 3,290,009
Patented Dec. 6, 1966

3,290,009
APPARATUS FOR CONVEYING A HEAVY LINE
DOWN A STEEP HILLSIDE
Darrell E. Carper and Arthur B. Caldwell, both of
Halfway, Oreg.
Filed Oct. 1, 1965, Ser. No. 492,144
2 Claims. (Cl. 254—147)

This invention relates in general to the dragging of objects over the ground by means of a cable operated from a winch located at some station to which the objects are required first to be moved; and, more specifically, the invention relates to the dragging of logs up a sloping hillside or mountainside to an assembly point from which further handling or transporting of the logs takes place.

In common practice in logging in the woods the logs are dragged to an assembling station at which a power-driven winch of some sort is located which may be mounted on or associated with a donkey engine, tractor, spar tree or similar logging equipment. When the terrain is such that a tractor can travel to the approximate location of the logs, the carrying of the heavy cable, or so-called "bull" line, to which each log in turn is attached for dragging over the ground to the assembly point, does not present any particular problem. However, when the logs are required to be dragged up a steep slope, which often happens in logging in mountainous country, where the slope is too steep for travel by a even a Caterpillar tractor, the heavy cable or "bull" line must be conveyed down the steep slope from the point where the tractor and winch, or similar equipment, are located to the location of the log. Heretofore in such circumstances the "bull" line customarily has been taken down the slope manually and this has been done at the expense of time and considerable labor on the part of at least two men engaged in the logging.

The object of the present invention is to provide a simple and practical apparatus which, of its own accord, impelled by the force of gravity, will carry the "bull" line or heavy cable down such a slope.

A related object is to provide a suitable apparatus for this purpose which will be easy to manufacture, camparatively moderate in cost, and which will present no particular maintenance problem.

The manner of which these objects are attained by the device of the present invention, and the construction and manner of operation of the device will be readily understood from the following brief description with reference to the accompanying drawings.

In the drawings:

FIG. 1 is a more or less diagrammatic illustration showing the device after it has pulled the heavy cable down to the bottom of a steep incline and where the cable, or "bull" line, has been there connected through the medium of a "choker" line to the log to be hauled up the incline;

FIG. 2 shows one of the two half portions of the device in elevation, with part broken away for clarity, and shows the other half portion of the device in corresponding sectional elevation; and FIG. 3 is a section through the center of a device taken on the line 3—3 of FIG. 2 but drawn to a smaller scale.

Referring first to FIG. 2, briefly the device consists of a substantially spherical heavy ball B, formed of two identical, spaced-apart but connected, independently rotatably mounted, semi-spherical portions, indicated in general by the reference characters 10 and 11 in FIG. 2. The diameter of the ball is preferably about 5 feet, since this size has been found to be very appropriate and practical in actual use in logging. The semi-spherical portions 10 and 11 are identical so it will suffice to describe one of them, namely the semi-spherical portion 10, with reference to FIG. 2.

Each semi-spherical portion has an outer shell of iron, and, depending upon the thickness of the outer shell, is formed with such suitable inside reinforcing webs as may be required. The construction in any case must be strong enough and heavy enough so that the ball can withstand rough usage including encouners with obstacles in its path. We have found in an outer shell with a thickness of from one to three inches is preferable in a ball of aproximate 5 feet in diameter, although we have also found that a ball of this size with a thinner outer shell will be satisfactory in most cases. The mass or weight of the ball must be sufficient to cause it to be subjected to a sufficient gravity pull to enable it to draw the heavy cable or "bull" line down the slope. Generally we have found that a total weight of approximately 1,200 pounds to be sufficient, and a 5 foot ball of this weight is not an an inconvenient piece of equipment for transporting or setting in place.

Referring against to the semi-spherical portion 10 in FIG. 2, a flat inner or top face 13 is welded to the rim or top periphery of the semi-spherical outer shell 12. This flat face 13 may comprise a single plate or may be conveniently formed of plates welded together, and its integral or welded connection with the entire rim of the semi-spherical shell serves to prevent denting or disforming of the rim under heavy usage of the ball. The flat face 13 is preferably conveniently formed with openings as indicated at 14, and the face 13 has a small central opening 15 in order to allow clearance for a common connecting axle shaft as presently mentioned.

The outer shell 12 is formed with a centrally located open cylindrical recess 16. Extending inwardly from the inside wall 17 of this recess, and rigidly braced thereto, is a hub 18, such, for example, as the hubs for wheels used on logging trucks. The hub is provided with suitable bearings, as indicated in FIG. 2, for an axle 19. A removable cap 20 is provided for the hub and bearings, enabling the hub to be packed with suitable lubricant. The end of the axle 19 carries the usual nut 21, and, upon removal of the cap 30 and removal of the nut 21, the entire semi-spherical portion 10 may be removed from the axle 19, should this be desired for any reason.

The other identical semi-spherical portion 11 is identically mounted on the other identical half portion of the common axle 19, the length of the axle 19 being such that, when the two semi-spherical portirons 10 and 11 are secured on the respective ends of the common axle, they will be spaced apart at their inner faces a distance of about 6 inches.

Thus, while the two semi-spherical portions are held together in slightly spaced relationship, each portion is freely mounted for rotation entirely independent of the other.

A strong heavy tongue 22 is solidly welded to or formed integral with the common axle 19 at the longitudinal center of the axle, and thus midway between the opposed inner flat faces of the two semi-spherical portions. The tongue 22 extends out beyond the outer surface of the composite ball, as shown in FIG. 2, and terminates at the other end in a head carrying a suitable pivoted link 23 which is connected to a corresponding pivoted link 24 on a compound swivel assembly 25, to which the end of the haul cable or "bull" line 26 is connected by suitable means. The log to be hauled by the cable or "bull" line is attached to a "choker" line 27 which is also connected to the swivel assembly 25.

As a safety measure, in the event the tongue 22 should be broken, a safety loop of cable 28 extends around the axle 19 and is fastened to the swivel assembly secured to the "bull' line.

The manner in which the apparatus is employed will now be readiyl apparent from FIG. 1. It is assumed that a log, indicated at L, located below a long steep slope S, is to be hauled first to a point at the top of the slope to which a tractor T has been driven, the hillside slope S being such that it is not possible for the tractor to proceed any further. The tractor is equipped with a power-driven winch on the drum of which the cable 26 or "bull" line is wound, and the outer end of the line is attached to the apparatus or ball B. When the ball is set in postion at the top of a slope the drum on the winch is released so as to be free to rotate, and the ball, with the cable 26 attached thereto, is allowed to roll down the slope carrying the cable with it.

Since both semi-spherical portions of the ball are free to rotate, and since the ball can also turn over in a lateral direction freely because of its swivel connection with the cable without any attempted twisting of the cable, the ball will readily and rapidly pass over rough ground and around minor obstacles, carrying the end of the cable with it until the bottom of the slope is reached, or as long as the cable is being freely released from the winch. The fact that the outer ends of the hubs and the hub caps are recessed inwardly from the outer contour of the ball prevents them from being damaged by contact with any obstacles encountered by the ball or from offering any interference with the travel of the ball by catching on any obstacles.

The "choker" line 27 is also carried along with the ball, and when the ball has arrived in the vicinity of the desired log, the "choker" line is then made fast to the log in the usual manner, after which the ball and log are hauled up the slope by operation of the winch.

Thus with the apparatus of the present invention the laborious operation of dragging a heavy cable or "bull" line down a steep inaccessible slope whenever a log has to be hauled up such a slope, is dispensed with.

We claim.

1. An apparatus for conveying the end of a cable down a hillside including a heavy ball composed of two identical semi-spherical portions, said portions being rotatably mounted on a common axial shaft and spaced a slight distance apart, a tongue connected to said common axial shaft at the longitudinal center of said shaft between said semi-spherical portions, said tongue extending out beyond the outer faces of said portions, and means connecting the outer end of said tongue with the end of the cable being conveyed by said ball.

2. An apparatus for conveying the end of a logging "bull" line down a hillside comprising a heavy ball composed of two hollow identical semi-spherical portions, a common axial shaft for said portions, a hub in each of said portions, said hubs rotatably mounted on the ends of said common shaft respectively, whereby each of said portions is rotatable on said shaft independently of the other, said shaft and said hubs so arranged that the opposed faces of said portions will be spaced a slight distance apart, a hub cap on each hub, the outer face of each of said portions formed with a central recess, said caps and the outer ends of said hubs located within said recesses respectively, means connecting said common axial shaft at its longitudinal center between said semi-spherical portions with the end of the logging line being conveyed by said ball, and a swivel assembly in said means.

References Cited by the Examiner

UNITED STATES PATENTS

| | | | |
|---|---|---|---|
| 552,227 | 12/1895 | Baptist | 254—147 |
| 2,490,378 | 12/1949 | Mount | 254—147 |

EVON C. BLUNK, *Primary Examiner.*

H. C. HORNSBY, *Assistant Examiners.*